United States Patent
Luttinen et al.

(10) Patent No.: US 9,150,070 B2
(45) Date of Patent: Oct. 6, 2015

(54) ACTIVELY CONTROLLED TORSION BAR SUSPENSION

(71) Applicant: GM GLOBAL TECHNOLOGY OPERATIONS LLC, Detroit, MI (US)

(72) Inventors: James L. Luttinen, Brighton, MI (US); Jeffry Pniewski, Dryden, MI (US); Giles D. Bryer, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 14/057,027

(22) Filed: Oct. 18, 2013

(65) Prior Publication Data

US 2015/0108732 A1 Apr. 23, 2015

(51) Int. Cl.
| | |
|---|---|
| *B60G 3/26* | (2006.01) |
| *B62D 7/18* | (2006.01) |
| *B60G 3/20* | (2006.01) |
| *B60G 11/18* | (2006.01) |
| *B60G 17/02* | (2006.01) |

(52) U.S. Cl.
CPC *B60G 3/265* (2013.01); *B60G 3/20* (2013.01); *B60G 11/182* (2013.01); *B60G 17/025* (2013.01); *B62D 7/18* (2013.01); *B60G 2200/144* (2013.01); *B60G 2202/13* (2013.01)

(58) Field of Classification Search
CPC ........ B60G 3/265; B60G 3/20; B60G 17/025; B60G 11/182; B60G 2202/13; B60G 2200/114; B62D 7/18
USPC ........... 280/5.507, 93.512, 124.106, 124.107, 280/124.156, 124.116, 124.103, 81.6
See application file for complete search history.

(56) References Cited

U.S. PATENT DOCUMENTS

| | | | |
|---|---|---|---|
| 2,763,494 A * | 9/1956 | Toms ................... | 280/124.153 |
| 2,962,297 A * | 11/1960 | Cislo ................... | 280/6.158 |
| 3,709,314 A * | 1/1973 | Hickey ................ | 180/249 |
| 4,738,466 A * | 4/1988 | Mikina ................ | 280/124.107 |
| 6,499,754 B1 * | 12/2002 | Heyring et al. ...... | 280/124.106 |
| 7,111,849 B2 * | 9/2006 | Yun ..................... | 280/5.52 |
| 7,377,522 B2 * | 5/2008 | MacIsaac ............ | 280/5.507 |
| 7,549,658 B2 * | 6/2009 | Kunert et al. ........ | 280/124.167 |
| 7,559,403 B2 * | 7/2009 | Schmitz ............... | 180/344 |
| 7,962,261 B2 * | 6/2011 | Bushko et al. ...... | 701/37 |
| 8,191,911 B1 * | 6/2012 | Reynolds ............. | 280/124.166 |
| 2006/0001311 A1 * | 1/2006 | Platner et al. ....... | 301/124.1 |
| 2006/0103127 A1 * | 5/2006 | Lie et al. ............. | 280/781 |
| 2012/0304888 A1 * | 12/2012 | Gilmartin et al. ... | 105/199.2 |

FOREIGN PATENT DOCUMENTS

GB 1016596 A * 1/1966

* cited by examiner

*Primary Examiner* — Ruth Ilan
*Assistant Examiner* — Darlene P Condra
(74) *Attorney, Agent, or Firm* — Quinn Law Group, PLLC

(57) ABSTRACT

A suspension system for a vehicle having a vehicle body arranged along a first axis includes a steering knuckle configured to rotatably support the vehicle's road wheel. The system also includes a torsion bar that is configured to generate a spring rate and arranged along a second axis that forms an acute angle relative to the first axis. The system also includes a tensile drop link fixed relative to the steering knuckle. The system additionally includes a semi-trailing arm having a first end and a distal second end, wherein the semi-trailing arm is operatively connected to a first end of the torsion bar at the first end of the arm and to the tensile drop link at the second end of the arm. Furthermore, the system includes an actuator fixed relative to the body and configured to rotate a second end of the torsion bar about the second axis.

20 Claims, 4 Drawing Sheets

ACTIVELY CONTROLLED TORSION BAR SUSPENSION

TECHNICAL FIELD

The present disclosure relates to an actively controlled torsion bar suspension for a vehicle.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface. Additionally, the design of the suspension also influences the height of the vehicle body relative to the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

SUMMARY

A suspension system for maintaining contact between a road surface and a road wheel of a vehicle having a vehicle body is disclosed. The suspension system includes a steering knuckle configured to rotatably support the wheel. The suspension system also includes a torsion bar having a first end and a distal second end, wherein the torsion bar is configured to generate a spring rate and is arranged along a second axis that forms an acute angle with respect to the first axis. The suspension system also includes a tensile drop link fixed relative to the steering knuckle. The suspension system additionally includes a semi-trailing arm having an arm first end and a distal arm second end, wherein the semi-trailing arm is operatively connected to the first end of the torsion bar at the first end of the arm and to the tensile drop link at the second end of the arm. Furthermore, the suspension system includes an actuator fixed relative to the vehicle body and configured to rotate the second end of the torsion bar about the second axis.

The suspension system may also include a damper (shock absorber) having a first end and a second end, wherein the first end of the damper is connected to the semi-trailing arm and the second end of the damper is connected to the vehicle body.

The vehicle may also include a powerplant and a drive shaft. The powerplant is configured to generate a drive torque for propelling the vehicle. The drive shaft has a first end operatively connected to the powerplant and a distal second end operatively connected to the wheel for transmitting the drive torque to the wheel. The suspension system may additionally include a tie rod and a steering rack. The tie rod is operatively connected to the steering knuckle, and the steering rack is configured to rotate the steering knuckle about a third axis via the tie rod to thereby turn the wheel relative to the vehicle body. In such a case, the damper may extend between the tie rod and the drive shaft.

The suspension system may also include an upper control arm and a lower control arm, each operatively connecting the steering knuckle to the vehicle body.

Furthermore, the drive shaft may extend between the upper control arm and the lower control arm. In such a case, the semi-trailing arm may extend between the drive shaft and the lower control arm.

The vehicle may also include a controller configured to regulate the actuator for rotating the second end of the torsion bar about the second axis.

The vehicle may additionally include a sensor configured to detect a vehicle behavior parameter and communicate the parameter to the controller such that the controller regulates the actuator in response to the communicated parameter to thereby establish real-time, active control of the torsion bar.

The detected vehicle behavior parameter may be vehicle cornering. In such a case, the controller may rotate the second of the torsion bar about the second axis via the actuator to vary an initial torque input to the torsion bar to thereby counter a load generated by the vehicle cornering on the vehicle body at the suspension corner.

The controller may also rotate the second end of the torsion bar about the second axis via the actuator to thereby set a height of the vehicle body relative to the road surface at the suspension corner.

The suspension system may also include a bearing configured to rotatably support the first end of the torsion bar relative to the vehicle body.

The torsion bar may either be a hollow tubular component or a component hybrid structure constructed from a combination of a solid bar and hollow tube.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
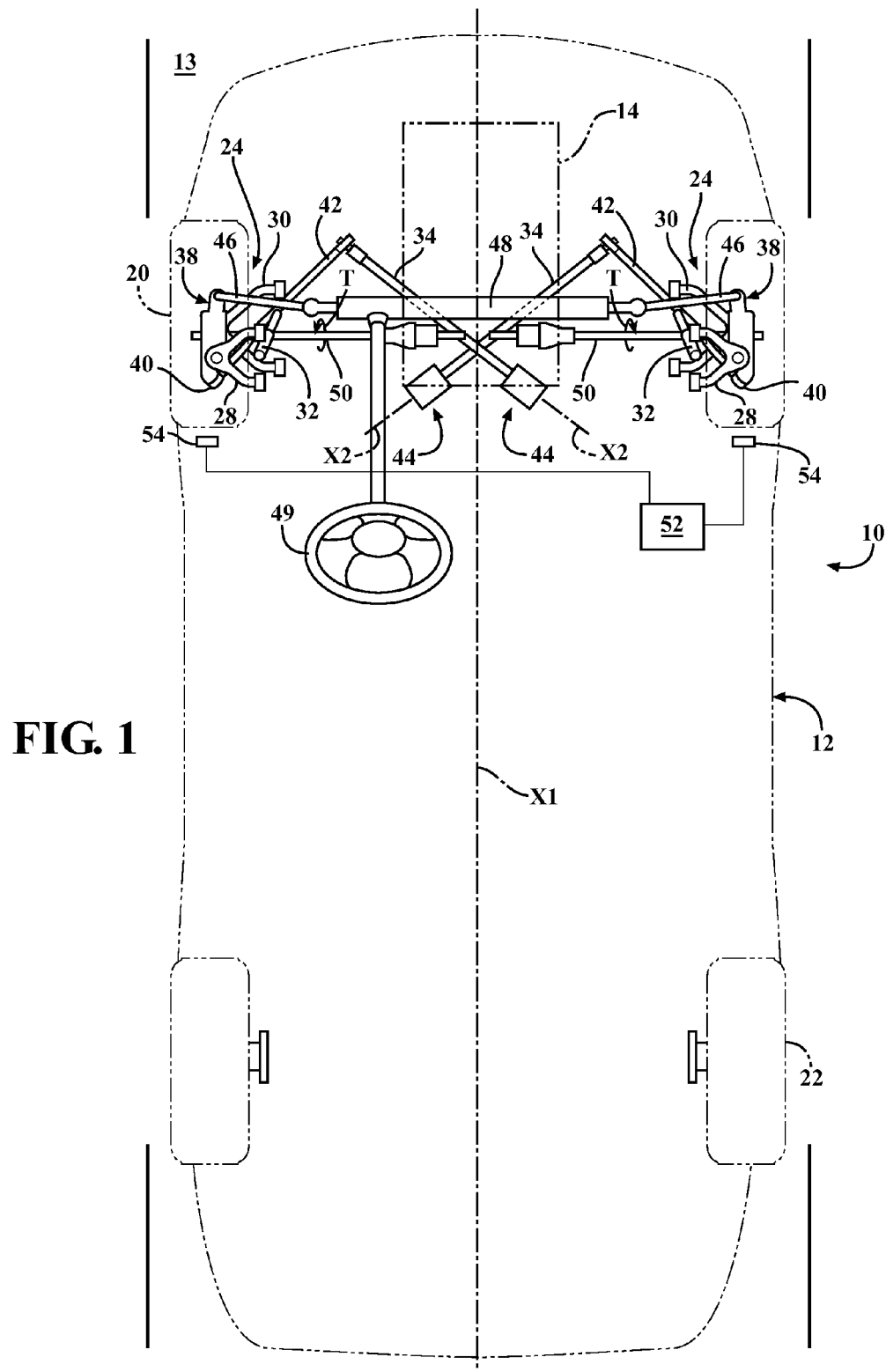
FIG. 1 is a schematic plan view of a motor vehicle having a suspension system with individual suspension corners according to the disclosure.

Referring to the drawings, wherein like reference numbers refer to like components, FIG. 1 shows a schematic view of a motor vehicle 10, which includes a vehicle body 12. As shown, the vehicle body 12 is arranged along a centerline or first axis X1. The vehicle 10 also includes a powerplant 14 configured to generate a drive torque T for propelling the vehicle 10. The powerplant 14 may include an internal combustion engine, one or more motor/generators, and/or a fuel cell, neither of which are specifically shown, but a powerplant including such devices would be appreciated by those skilled in the art.

Figure 2:
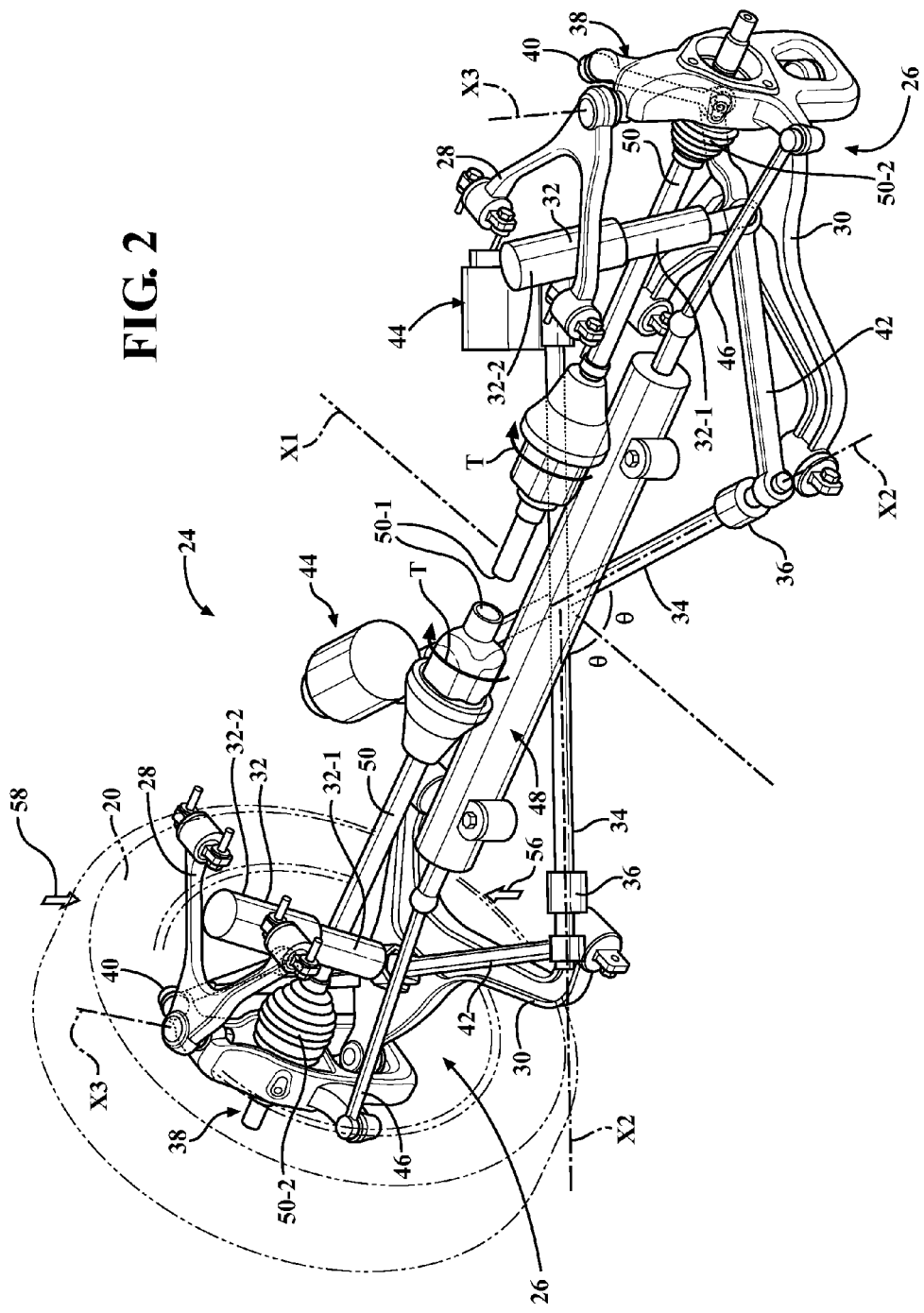
FIG. 2 is a schematic close up perspective view of the suspension system shown in FIG. 1.
Figure 3:
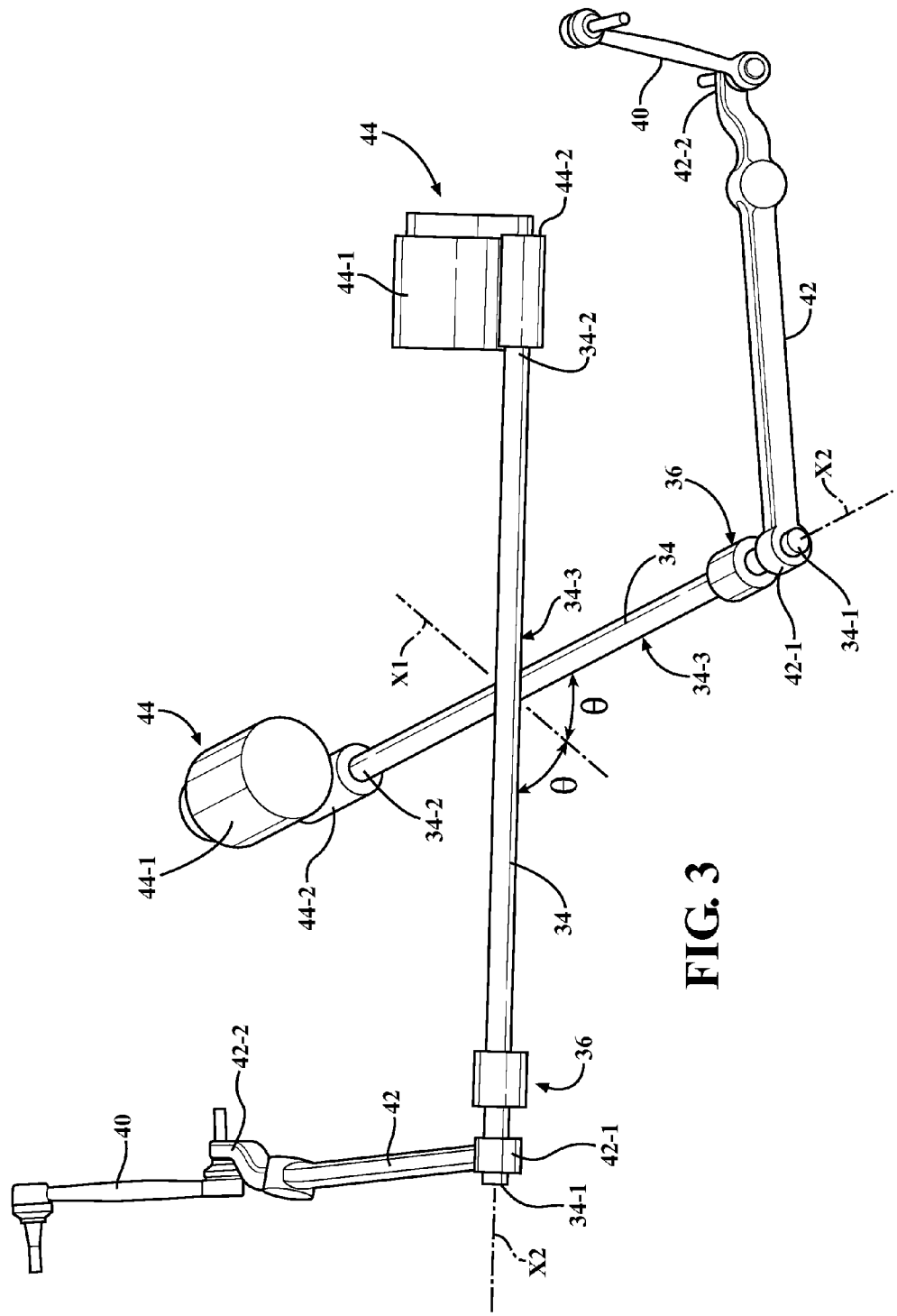
FIG. 3 is a schematic close up perspective partial view of the suspension system shown in FIG. 1.

The vehicle 10 also includes a plurality of road wheels that includes front wheels 20 and rear wheels 22. Although a total of four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. As shown in FIGS. 1-3, the suspension system 24 includes an individual suspension corner 26 at each of the front wheels 20, i.e., substantially at the front of the vehicle 10. Each suspension corner 26 includes an upper control arm 28, a lower control arm 30, and a shock absorber or damper 32. Additionally, each suspension corner 26 includes a torsion bar 34 that is configured to operate as a spring and may also perform the function of a stabilizer bar, as understood by those skilled in the art.

As shown in FIG. 2, the upper and lower control arms 28, 30 may be pivotally supported relative to the vehicle body 12 on bushings (not shown) having a specifically selected degree of compliance. The damper 32 includes a first damper end 32-1 and a second damper end 32-2. The torsion bar 34 includes a first bar end 34-1, a distal second bar end 34-2, and an intermediate section 34-3. As shown in FIGS. 2-3, the torsion bar 34 may be rotatably supported at the first bar end 34-1 relative to the body by a bearing 36. The bearing 36 may be mounted on the vehicle body 12 at reinforced, load-bearing body structure locations, such as on a vehicle sub-frame or powertrain cradle, neither of which are shown, but the existence of which would be appreciated by those skilled in the art. As shown, the torsion bar 34 is arranged along a second axis X2 that extends at an acute angle θ, i.e., diagonally, with respect to the first axis X1. As shown, when positioned in the vehicle 10, the torsion bar 34 may extend across the centerline of the vehicle, i.e., intersect the first axis X1.

Figure 5:
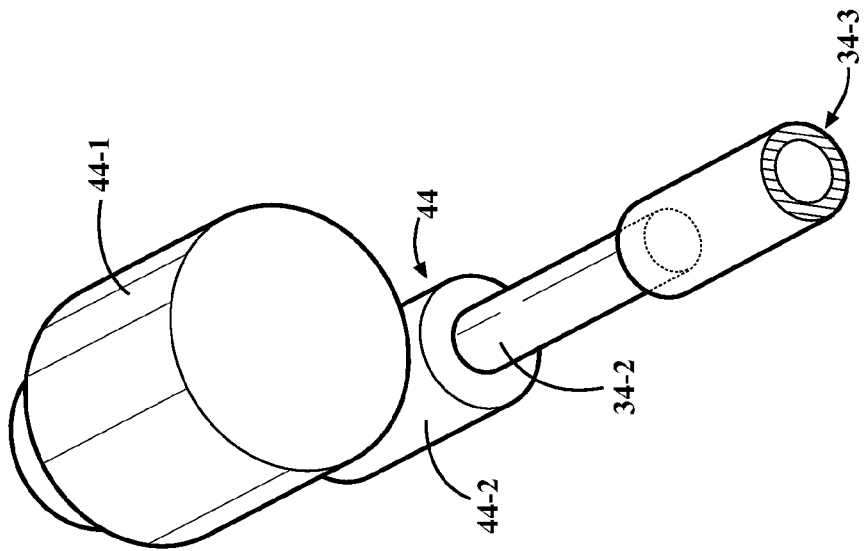
FIG. 5 is a schematic perspective cross-sectional illustration of another embodiment of the torsion bar employed in the suspension system shown in FIGS. 1-3.
Figure 4:
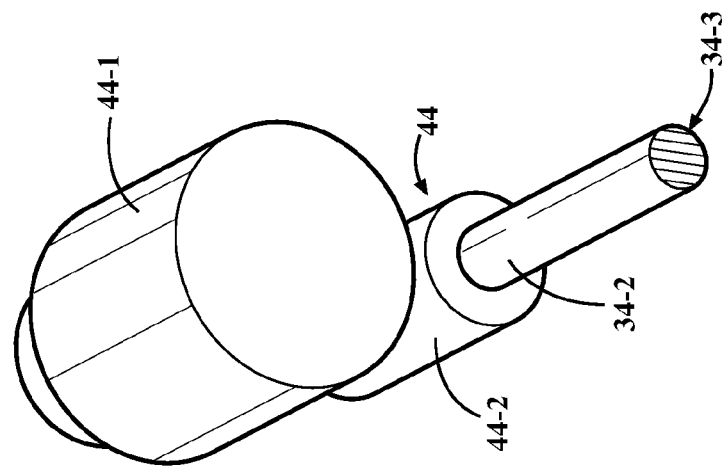
FIG. 4 is a schematic perspective cross-sectional illustration of one embodiment of a torsion bar employed in the suspension system shown in FIGS. 1-3.

The torsion bar 34 may be configured as either a hollow tubular component (as shown in FIG. 4) or a hybrid component constructed from a combination of solid bar and hollow tube (as shown in FIG. 5). In the case of a hybrid component, each of the first bar end 34-1 and the second bar end 34-2 may be configured as a solid bar, while the intermediate section 34-3 may be configured as a hollow tube (as shown), or as any combination of solid and hollow sections. Additionally, a hybrid torsion bar 34 may arrange the solid bar and hollow tube sections in any position with respect to the first bar end 34-1, second bar end 34-2, and intermediate section 34-3. In the hybrid torsion bar 34, the torsion bar may be assembled by having the hollow tube welded or splined to the solid bar, or by any other means that permit the torsion bar to withstand loads during operation that will be described in detail below.

Each suspension corner 26 also includes a steering knuckle 38. The steering knuckle 38 is configured to rotatably support a respective road wheel 20 via a wheel hub and bearing assembly (not shown). FIGS. 2-3 depict a representative corner 26 of the suspension system 24, which includes a respective steering knuckle 38. Each steering knuckle 38 may be operatively connected to the body 12 via the upper control arm 28 and the lower control arm 30. As also shown, each suspension corner 26 also includes a tensile drop link 40 that is fixed relative to the steering knuckle 38, and also includes a semi-trailing arm 42. Each semi-trailing arm 42 includes a first arm end 42-1 and a distal second arm end 42-2. Furthermore, each semi-trailing arm 42 is operatively connected to the first bar end 34-1 at the first arm end 42-1 and to the tensile drop link 40 at the second arm end 42-2.

Each damper 32 is arranged such that the first damper end 32-1 is connected to the semi-trailing arm 42 and the second damper end 32-2 is connected to the vehicle body 12. Accordingly, each torsion bar 34 is connected to the respective steering knuckle 38 via the tensile drop link 40 and the semi-trailing arm 42. The torsion bar 34 is configured to generate a specific spring rate in order to cushion forces experienced by a respective knuckle 38 through the wheel 20 as the vehicle 10 traverses the road surface 13, while the damper 32 is configured to dampen or attenuate motion of the respective steering knuckle. Accordingly, each steering knuckle 38 has its motion controlled by the combination of damper 32 and torsion bar 34 relative to the vehicle body 12 in response to the vehicle 10 traversing a specific road surface 13.

The vehicle suspension system 24 also includes actuators 44. Each actuator 44 is fixed relative to the vehicle body 12 by being mounted directly thereto or to the vehicle sub-frame or powertrain cradle. Each actuator 44 is configured to rotate the respective bar second end 34-2 about the second axis X2 to selectively pitch the respective steering knuckle 38 either toward or away from the road surface 13 by loading the tensile drop link 40 via the second arm end 42-2 of the semi-trailing arm 42. By rotating the bar second end 34-2 about the second axis X2, the actuator 44 may vary or adjust an initial torque input into the respective torsion bar 34, i.e., a torque seen by the torsion bar prior to variation in forces external to the vehicle 12. Additionally, the actuator 44 may adjust a height H of the vehicle body 12, i.e., vehicle ride height, at a respective suspension corner 26 by rotating the bar second end 34-2 about the second axis X2. As shown in FIG. 3, the actuator 44 may include an electric motor 44-1 that is configured to rotate the bar second end 34-2 through a gear-set 44-2.

The vehicle 10 also includes tie rods 46. Each tie rod 46 is operatively connected to the respective steering knuckle 38. Additionally, as shown in FIGS. 1 and 2, the vehicle 10 includes a steering rack 48 configured to rotate the steering knuckles 38 via an input from the vehicle operator, such as by means of a steering wheel 49 (shown in FIG. 1), to steer the vehicle 10 with the wheels 20. Specifically, the steering rack 48 is configured to rotate each steering knuckle 38 about a respective third axis X3 via the tie rod 46 to thereby turn the wheels 20 relative to the vehicle body 12. The vehicle 10 additionally includes drive shafts 50 for transmitting the drive torque T of the powerplant 14 to the wheels 20.

Each drive shaft 50 includes a first shaft end 50-1 operatively connected to the powerplant 14 and a distal second shaft end 50-2 operatively connected to the respective wheel 20. Each damper 32 is positioned on the vehicle 10 in a way to extend between the respective tie rod 46 and the respective drive shaft 50. As shown in FIG. 2, each drive shaft 50 is positioned on the vehicle 10 in such a way as to extend between the respective upper control arm 28 and the respective lower control arm 30. As additionally shown, the semi-trailing arm 42 extends between the respective drive shaft 50 and the respective lower control arm 30 at each suspension corner 26.

The suspension system 24 may also include a controller 52 configured to regulate the actuator 44 for rotating the second bar end 34-2 about the second axis X2. The controller 52 may be a dedicated programmable electronic processor having tangible, non-transitory memory or a vehicle central processing unit (CPU) having same. As shown in FIG. 1, vehicle 10 may additionally include vehicle sensors, such as sensors 54, mounted on the vehicle body 12 and configured to sense or detect vehicle behavior parameters, e.g., changes in orientation of the vehicle relative to the road surface 13, and/or specific g-forces acting on the vehicle 10. Generally, the g-forces sensed by such sensors 54 may act on the vehicle 10 as a result of, and, therefore, be indicative of cornering, forward acceleration, and/or braking of the vehicle and the forces generated during such maneuvers.

Specific vehicle sensors may include a lateral acceleration sensor configured to detect as the vehicle 10 moves laterally with respect to the road surface 13, a longitudinal acceleration sensor that is configured to detect acceleration or deceleration of the vehicle along the first axis X1, and a yaw sensor configured to detect a yaw rate of the vehicle body 12. Additionally, the vehicle 10 may employ a stability control system (not shown) and the subject sensor 54 may be part of that system. The sensors 54 are also configured to communicate a signal indicative of the particular sensed parameter to the controller 52. Although only two sensors 54 are depicted, the vehicle 10 may employ as many sensors to assess as many individual vehicle behavior parameters as necessary for appropriate regulation of the actuator 44.

The controller 52 is configured to receive signals from each sensor 54 and control the actuators 44 based on such signals in real time, i.e., with a response time measured in milliseconds. The controller 52 is also programmed to determine changes in vehicle orientation relative to the road surface 13 as the vehicle 10 performs various maneuvers and in response to the received signals from the sensor 54. The controller 52 is additionally programmed to regulate each actuator 44 based on such determination. Specifically, the controller 52 may rotate the second bar end 34-2 about the second axis X2 via one actuator 44 to thereby vary the torque being applied to the respective torsion bar 34. Such variation in the initial torque applied to the torsion bars 34 may be employed to affect the response of the suspension system 24 to the vehicle 10 traversing a specific road surface 13.

An increase in the initial torque input to the torsion bar 34 would counter an external load being seen by the vehicle at the particular suspension corner 26 in real time, such as during vehicle cornering. In a non-limiting example, the controller 52 could activate the actuator 44 in real time, during vehicle cornering to counteract g-forces generated thereby. In such a situation, the actuator 44 would be used to apply a force 56 via the torsion bar 34 that is directionally opposite to a force 58 generated in response to the g-forces at the suspension corner 26. As a result, by counteracting such g-forces acting on the vehicle body 12, the increased torque input to the second bar end 34-2 of the torsion bar 34 limits roll of the vehicle body at the subject suspension corner 26 relative to the road surface 13. Accordingly, real-time control of the initial torque input to the respective second bar ends 34-2 of torsion bars 34 via the respective actuators 44 provides active roll control for the vehicle 10 via the stabilizer bar function of the torsion bars. Such adjustability of the torsion bars 34 may permit use of softer initial torsion bar spring rates, thus providing a more compliant ride for the vehicle 10. Additionally, the above adjustability of the torsion bars 34 may permit the vehicle 10 to dispense with the need for separate fixed stabilizer bars, which tend to degrade ride quality over broken or uneven road surfaces.

The controller 52 may also rotate the second bar ends 34-2 of torsion bars 34 about the respective second axes X2 via the respective actuators 44 to thereby adjust and set the height H of the vehicle body 12 relative to the road surface 13 simultaneously at both suspension corners 26. Such adjustment of the height H may be performed when the vehicle 10 is either stationary or in motion. The height H may be reduced via the controller 52 at elevated speeds of the vehicle 10 to favorably impact the vehicle's coefficient of air drag and reduce the vehicle's fuel consumption. Furthermore, the height H may be increased via the controller 52 at reduced speeds, such as during parking lot maneuvers, or when the vehicle 10 is at rest to enhance the vehicle's ability to clear various road obstacles and facilitate occupant ingress and egress.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body arranged along a first axis;
   a road wheel configured to maintain contact with a road surface; and
   a vehicle suspension corner connecting the road wheel to the vehicle body and configured to maintain contact between the road wheel and the road surface, the vehicle suspension corner including:
      a steering knuckle configured to rotatably support the road wheel;
      a torsion bar having a first bar end and a distal second bar end, wherein the torsion bar is configured to generate a spring rate and is arranged along a second axis that forms an acute angle with respect to the first axis; and
      a tensile drop link fixed relative to the steering knuckle;
      a semi-trailing arm having a first arm end and a distal second arm end, wherein the semi-trailing arm is operatively connected to the first bar end at the first arm end and to the tensile drop link at the second arm end; and
      an actuator fixed relative to the vehicle body and configured to rotate the second bar end about the second axis.

2. The vehicle according to claim 1, wherein the suspension corner additionally includes a damper having a first damper end and a second damper end, and wherein the first damper end is connected to the semi-trailing arm and the second damper end is connected to the vehicle body.

3. The vehicle according to claim 2, further comprising:
   a powerplant configured to generate a drive torque for propelling the vehicle;
   a steering rack configured to rotate the steering knuckle about a third axis via a tie rod to thereby turn the wheel relative to the vehicle body; and
   a drive shaft having a first shaft end operatively connected to the powerplant and a distal second shaft end operatively connected to the wheel for transmitting the drive torque to the wheel;
   wherein the suspension corner additionally includes the tie rod operatively connected to the steering knuckle, and wherein the damper extends between the tie rod and the drive shaft.

4. The vehicle according to claim 3, wherein:
   the suspension corner additionally includes an upper control arm and a lower control arm, each operatively connecting the steering knuckle to the vehicle body;

the drive shaft extends between the upper control arm and the lower control arm; and the semi-trailing arm extends between the drive shaft and the lower control arm.

5. The vehicle according to claim 1, further comprising a controller configured to regulate the actuator for rotating the second bar end about the second axis.

6. The vehicle according to claim 5, further comprising a sensor configured to detect a vehicle behavior parameter and communicate the parameter to the controller such that the controller regulates the actuator in response to the communicated parameter to thereby establish real-time, active control of the torsion bar.

7. The vehicle according to claim 6, wherein:
the detected vehicle behavior parameter is vehicle cornering; and
the controller rotates the second bar end about the second axis via the actuator to vary an initial torque input to the torsion bar and thereby counter a load generated by the vehicle cornering on the vehicle body at the suspension corner.

8. The vehicle according to claim 5, wherein the controller rotates the second bar end about the second axis via the actuator to thereby set a height of the vehicle body relative to the road surface at the suspension corner.

9. The vehicle according to claim 1, wherein the suspension corner additionally includes a bearing configured to rotatably support the first bar end relative to the vehicle body.

10. The vehicle according to claim 1, wherein the torsion bar is one of a hollow tubular component and a hybrid component having a solid bar engaged with a hollow tube.

11. A suspension system for maintaining contact between a road surface and a road wheel of a vehicle having a vehicle body arranged along a first axis, the suspension system comprising:
a steering knuckle configured to rotatably support the wheel;
a torsion bar having a first bar end and a distal second bar end, wherein the torsion bar is configured to generate a spring rate and is arranged along a second axis that forms an acute angle with respect to the first axis; and
a tensile drop link fixed relative to the steering knuckle;
a semi-trailing arm having a first arm end and a distal second arm end, wherein the semi-trailing arm is operatively connected to the first bar end at the first arm end and to the tensile drop link at the second arm end; and
an actuator fixed relative to the vehicle body and configured to rotate the second bar end about the second axis.

12. The suspension system according to claim 11, further comprising a damper having a first damper end and a second damper end, wherein the first damper end is connected to the semi-trailing arm and the second damper end is connected to the vehicle body.

13. The suspension system according to claim 12, further comprising a tie rod operatively connected to the steering knuckle;
wherein the vehicle additionally includes:
a powerplant configured to generate a drive torque for propelling the vehicle;
a drive shaft having a first shaft end operatively connected to the powerplant and a distal second shaft end operatively connected to the wheel for transmitting the drive torque to the wheel; and
a steering rack configured to rotate the steering knuckle about a third axis via the tie rod to thereby turn the wheel relative to the vehicle body; and
wherein the damper extends between the tie rod and the drive shaft.

14. The suspension system according to claim 13, further comprising an upper control arm and a lower control arm, each operatively connecting the steering knuckle to the vehicle body;
wherein:
the drive shaft extends between the upper control arm and the lower control arm; and
the semi-trailing arm extends between the drive shaft and the lower control arm.

15. The suspension system according to claim 11, further comprising a controller configured to regulate the actuator for rotating the second bar end about the second axis.

16. The suspension system according to claim 15, further comprising a sensor configured to detect a vehicle behavior parameter and communicate the parameter to the controller such that the controller regulates the actuator in response to the communicated parameter to thereby establish real-time, active control of the torsion bar.

17. The suspension system according to claim 16, wherein;
the detected vehicle behavior parameter is vehicle cornering; and
the controller rotates the second bar end about the second axis via the actuator to vary an initial torque input to the torsion bar and thereby counter a load generated by the vehicle cornering on the vehicle body at the suspension corner.

18. The suspension system according to claim 15, wherein the controller rotates the second bar end about the second axis via the actuator to thereby set a height of the vehicle body relative to the road surface at the suspension corner.

19. The suspension system according to claim 11, further comprising a bearing configured to rotatably support the first bar end relative to the vehicle body.

20. The suspension system according to claim 11, wherein the torsion bar is one of a hollow tubular component and a hybrid component having a solid bar engaged with a hollow tube.

* * * * *